United States Patent [19]

Schaefer et al.

[11] 4,343,386

[45] Aug. 10, 1982

[54] BALL MOVEMENT COORDINATOR AND CAM MEMBER FOR TORQUE RESPONSIVE HUB CLUTCH

[75] Inventors: David V. Schaefer, Burlington; Clark J. Hamkins, Racine, both of Wis.

[73] Assignee: Tenneco Inc., Bannockburn, Ill.

[21] Appl. No.: 170,851

[22] Filed: Jul. 21, 1980

[51] Int. Cl.³ .............................................. F16D 13/04
[52] U.S. Cl. ................................... 192/54; 192/67 R; 192/93 R
[58] Field of Search ...................... 192/93 A, 54, 93 R, 192/35, 67 R, 70.23, 44, 45

[56] References Cited

U.S. PATENT DOCUMENTS

| 2,816,636 | 12/1957 | Weibel | 192/35 |
| 2,827,994 | 3/1958 | Tiedeman et al. | 192/93 A |
| 2,962,128 | 11/1960 | Luenberger | 192/44 X |
| 3,767,019 | 10/1973 | Wingler | 192/45 |
| 4,262,785 | 4/1981 | Anderson et al. | 192/54 |

*Primary Examiner*—George H. Krizmanich
*Attorney, Agent, or Firm*—Thomas E. Torphy; James R. Hagen

[57] ABSTRACT

An actuator ball movement coordinator and cam member for a torque responsive hub clutch of the ball and cam type serves to assure coordinated movement of a plurality of actuator balls and also cams the balls into positions which cause actuation of the clutch.

7 Claims, 6 Drawing Figures

BALL MOVEMENT COORDINATOR AND CAM MEMBER FOR TORQUE RESPONSIVE HUB CLUTCH

BACKGROUND OF THE INVENTION

Torque responsive clutches of the ball and cam type are used to engage a selectively driveable axle to a wheel hub to render the hub a driven hub when torque is applied to the axle and to render the hub free wheeling with respect to the axle when no torque is applied to the axle. Actuator balls receivable in a plurality of detents or recesses in a pair of opposed working surfaces are forced out of the detents to force the working surfaces axially further apart to force a drive gear drivingly engaged with the axle into driving engagement with a ring gear affixed to the wheel hub. U.S. Pat. No. 4,262,785 which is assigned to the assignee of this application discloses a ball and cam type torque responsive hub clutch.

BRIEF SUMMARY OF THE INVENTION

A ball movement coordinator and cam member for an automatic or torque responsive hub clutch serves to both assure simultaneous and uniform movement of a plurality of actuator balls and cam the balls radially outwardly to actuate the clutch when a rotatable detent ring commences to rotate with respect to a non-rotatable detent ring.

DETAILED DESCRIPTION OF THE PREFERRED EMBODIMENT

Figure 1:
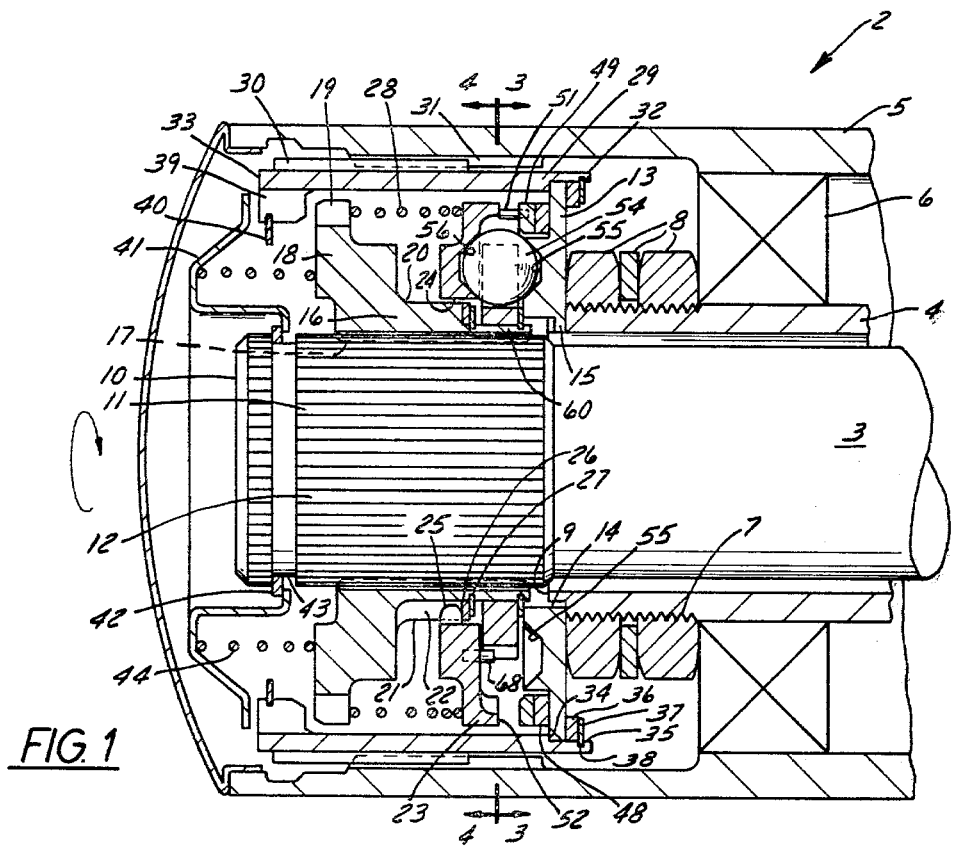
FIG. 1 shows a side sectional view of an end portion of a typical vehicle wheel hub having a disengaged automatic hub clutch.

FIG. 1 is a full sectional view of an end of a typical wheel assembly 2 such as those used on the selectively driveable wheels of four wheel drive vehicles. Such assemblies are generally comprised of a selectively driveable axle 3 which is journaled in a non-rotatable spindle 4. A wheel hub 5 is coaxially mounted and radially outwardly spaced from the axle and the hub is mounted for rotation about the spindle 4 by anti-friction means such as conventional tapered roller bearings 6. The spindle 4 typically has a radially outwardly facing threaded portion 7 for maintaining the spindle, the bearings and the wheel hub as an assembly by appropriate means 8 such as a threaded nut, a lock washer and a threaded lock or jam nut, as shown.

Spindle 4 has an outboard terminal end 9 and axle 3 extends axially beyond end 9 and terminates at an outboard terminal end 10. The portion 11 of axle 3 which extends beyond the end of the spindle contains a drive means, such as spline 12.

A first detent ring 13 having a central aperture 14 for receiving a portion of spindle 4 adjacent the end 9 of spindle 4 has a radially inwardly extending nib 15 which coacts with a complementary slot in the end of the spindle to non-rotatably affix detent ring 13 to spindle 4.

A drive means sub-assembly mounted for rotation with axle 3 is comprised of a substantially cylindrical base member 16 having axially slideable engagement means, such as radially inwardly projecting teeth 17 for engaging complementary teeth on spline 12 of axle 3. Base member 16 has a drive means such as radially outwardly extending drive gear 18 having a plurality of gear teeth 19. Base member 16 has a shoulder 20 defined by a radially outwardly facing surface 21. Shoulder 20 contains three axially extending, equally spaced slots, such as slot 22.

A second detent ring 23 is mounted coaxial with member 16 and has a central aperture 24 adapted for receiving and sliding axially over surface 21. A plurality of nibs or teeth, such as nib 25, extend radially inwardly from aperture 24. Each of the nibs 25 fits into one of the slots 22 to enable the second detent ring to move axially with respect to shoulder 20 of member 16 and to force the second detent ring 23 to rotate along with member 16 in response to rotation of axle 3. A support washer 26 and a spring type retaining washer 27 are used to limit axial movement of detent ring 23 to maintain each of the nibs 25 in its respective slot 22.

A biasing means, such as helical spring 28, is interposed between an axially inboard facing shoulder of member 16 and an axially outboard facing shoulder of detent ring 23 to resiliently urge the detent ring axially away from the drive gear 18.

A wheel hub engagement member 29 is substantially cylindrical in form and has a plurality of radially outwardly extending teeth 30 for drivingly engaging a number of complementary teeth 31 which extend radially inwardly from wheel hub 5. Engagement member 29 has an axially inboard terminal end 32 and an axially outboard terminal end 33.

Inboard end 32 is engaged with, and rotatable with respect to, detent ring 13. An axially inboard facing shoulder 34 is engageable with at least an axially outboard facing portion of detent ring 13 to limit axial inboard movement of member 29 with respect to detent ring 13. At least a portion, such as portion 35, of member 29 is radially outwardly spaced from a peripheral surface of detent ring 13 and extends axially inward beyond detent ring 13. Retaining means, such as bearing washer 36 and spring type retainer 37 engaged with a slot 38 in member 29, maintain member 29 substantially axially affixed relative to detent ring 13 while enabling rotation of member 29 with respect to non-rotatable detent ring 13.

Adjacent outboard end 33 of member 29 a hub drive means is provided. The hub drive means is comprised of a plurality of radially inwardly extending drive teeth 39. Drive teeth 39 are mutually drivingly engageable with drive teeth 19 on drive gear 18.

A retention means, such as spring type retaining washer 40, is affixed to member 29 adjacent outboard end 33 to maintain the drive and actuating portions of the hub clutch as an assembly to facilitate shipment and installation of the clutch.

Adjacent outboard termianl end 10 of axle 3 a spring retainer means, such as spring retainer cup 41, is provided. Cup 41 is restrained from axial outboard movement with respect to axle 3 by appropriate restraining means, such as spring type retaining washer 42, engaged with groove 43 in axle 3. A biasing means such as helical spring 44, is interposed between drive gear 18 and spring retainer cup 41 to resiliently urge drive gear 18 axially inboard out of engagement with the gear teeth 39 on wheel hub engagement member 29.

Figure 2:
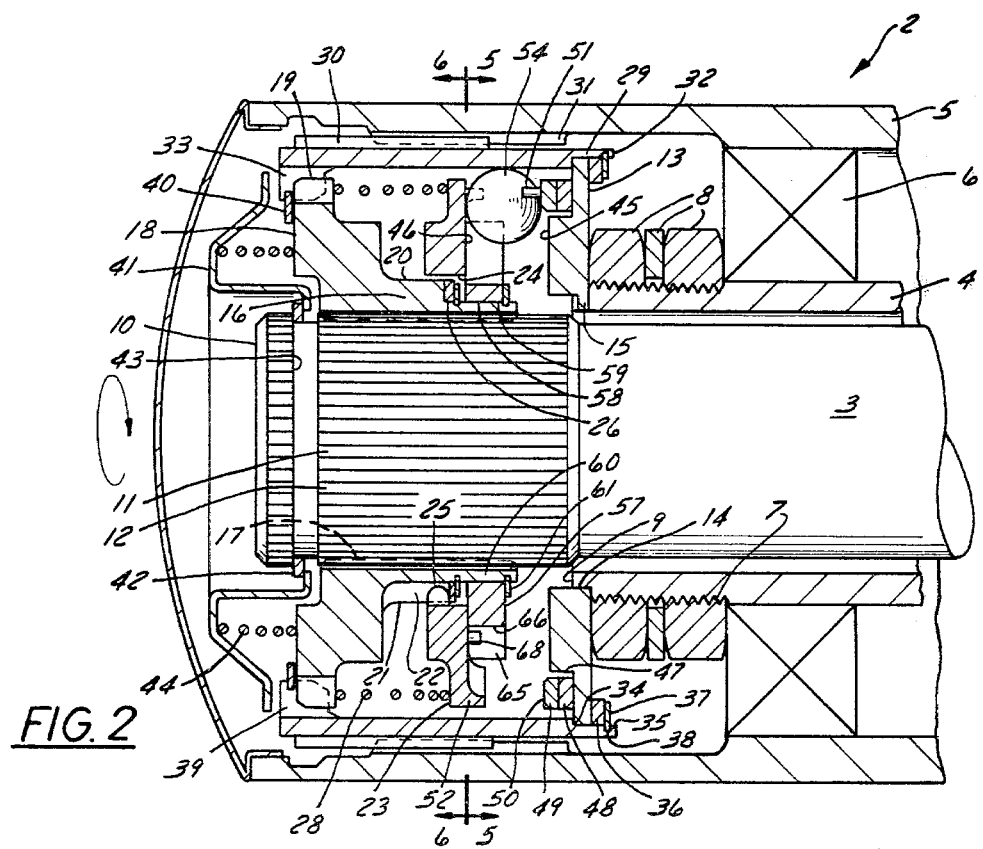
FIG. 2 shows the wheel hub shown in FIG. 1 in which the clutch is engaged.

Referring now to FIG. 2 it will be seen that detent ring 13 has an axially outboard facing surface 45 and detent ring 23 has an axially inboard facing surface 46.

Additionally, detent ring 13 has a radially outwardly facing shoulder 47. Spaced radially outwardly from shoulder 47 and coaxial with it is an annular bearing means comprised of an annular member 48 and an annular member 49. Annular member 48 is preferably comprised of a sintered metal, such as bronze, impregnated with a lubricant to reduce friction. Member 49 has an axially outboard facing surface 50. Surface 50 of member 49 comprises a portion of the working surface 45 of detent ring 13. However, surface 50 is rotatable with respect to detent ring 13 and, of course, working surface 45 is not rotatable with respect to detent ring 13.

Extending axially outward from surface 50 of bearing member 49 are a plurality of engagement members, such as engagement pin 51.

Detent ring 23 has adjacent its radially outermost axially inboard facing periphery an axially inboard extending cam lip 52. As best seen in FIGS. 3, 4, 5 and 6 cam lip 52 has a plurality of openings or slots 53.

Figure 3:
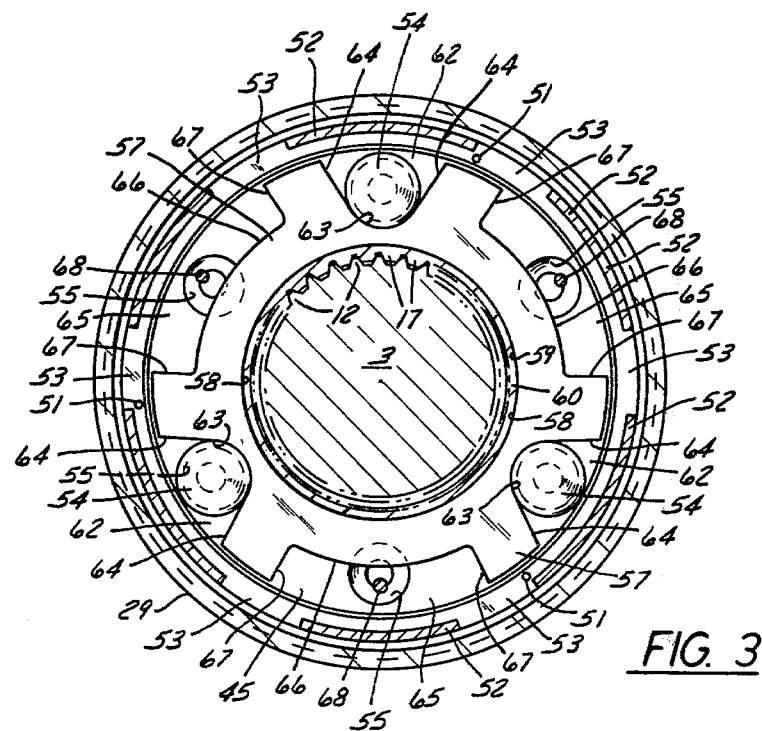
FIG. 3 is a sectional view of FIG. 1 as indicated by the section lines.
Figure 4:
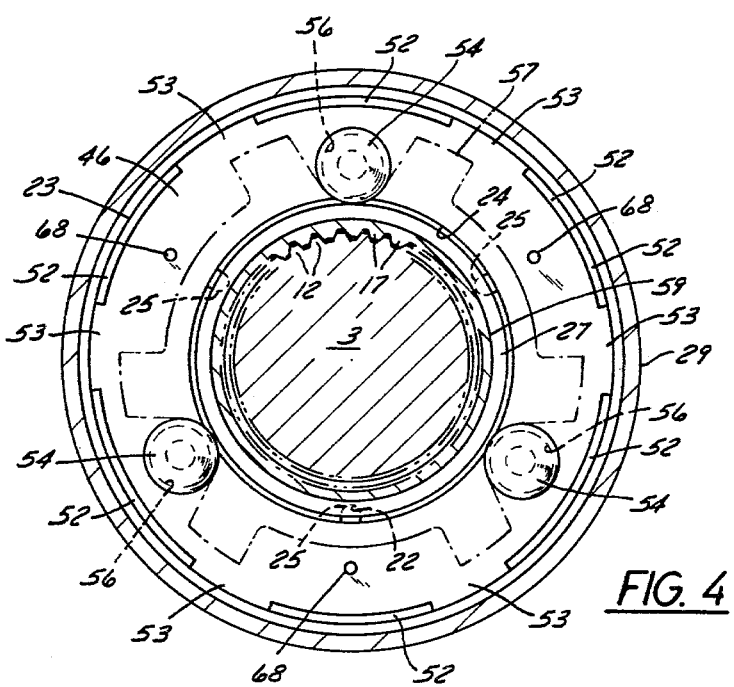
FIG. 4 is a sectional view of FIG. 1 as indicated by the section lines.

Referring again to FIGS. 1 and 2, a plurality of actuator members, such as actuator ball 54, are interposed between detent rings 13 and 23. As shown, detent ring 13 has a plurality of ball receiving openings or detents 55 on working surface 45 and each ball receiving opening or detent extends axially inboard away from working surface 46 of detent ring 23. Similarly, detent ring 23 has a plurality of ball receiving detents 56 having a ball receiving opening on working surface 46 and extending axially outboard away from working surface 45 of detent ring 13. As best shown in FIGS. 3 and 4 respectively, the detents 55 in detent ring 13 and the detents 56 in detent ring 23 are placed in the detent rings in a radially equal pattern equidistant from each other whereby each detent in detent ring 13 is axially alignable with a corresponding detent in detent ring 23 when the detent rings are rotated to cause the detents to be axially aligned.

Also interposed between detent ring 13 and detent ring 23 is a ball movement coordinator and cam member 57. Member 57 is substantially annular in shape and has a central aperture 58 defined by a radially inward facing surface 59. Aperture 58 is appropriately sized to receive, and be rotatable with respect to, a substantially cylindrical portion 60 of base member 16. A retention means, such as spring-type retainer 61, maintains member 57 mounted on portion 60 of member 16.

Figure 5:
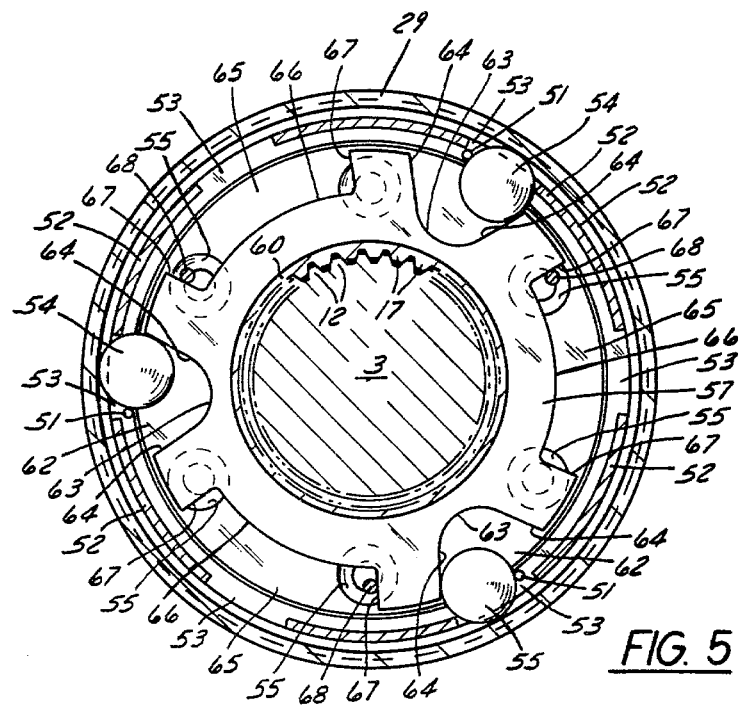
FIG. 5 is a sectional view of FIG. 2 as indicated by the section lines.

As best seen in FIGS. 3 and 5 ball movement coordinator and cam member 57 has three equally spaced ball receiving and camming recesses 62 radially outwardly spaced from aperture 58 and spaced equidistant from each other. Each of the recesses 62 has a radially innermost portion 63 sized to receive an actuator ball 54 and two sides or walls 64 which diverge radially outwardly from portion 63. Sides 64 extend from portion 63 radially outwardly to the periphery of member 57. The sides 64 serve as camming ramps to impel an actuator ball radially outwardly from portion 63 upon rotation of member 57 relative to the rotation of the actuator ball.

Spaced between each of two of the recesses 62 is a cam member movement control slot 65. Each slot 65 is formed of a radially innermost base surface 66 and two ends 67.

Figure 6:
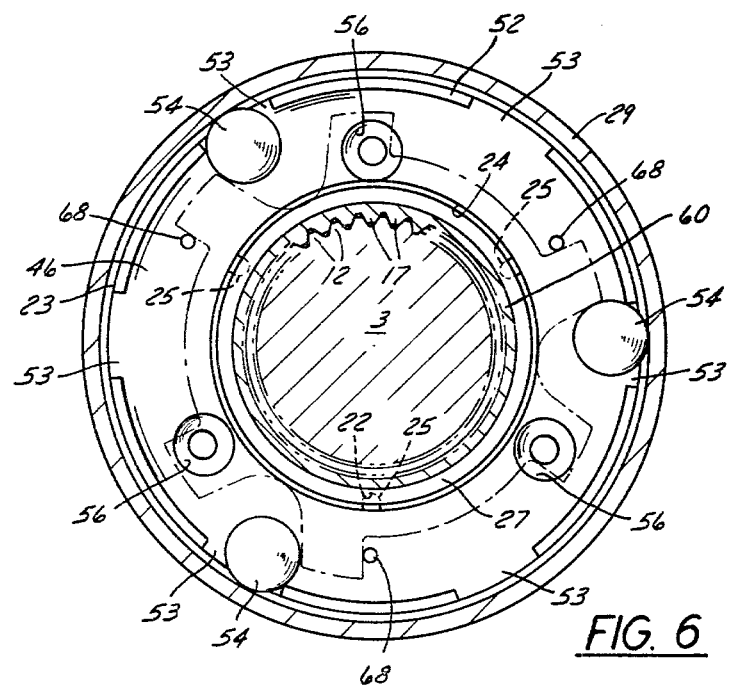
FIG. 6 is a sectional view of FIG. 2 as indicated by the section lines.

A relative rotation control means, such as a plurality of axial inboard extending engagement pins, such as pin 68 shown in FIG. 2, are fixedly secured to detent ring 23 and extend axially inboard from surface 46. The plurality of engagement pins 68 are, as best shown in FIGS. 4 and 6, positioned in a circular pattern concentric with portion 59 of the base member and equally spaced about the circular pattern.

Each engagement pin 68 is positioned to be received within a control slot 65 of member 57. Each pin 68 is radially outwardly spaced from base 66 and positioned to contact an end 67 of one of the control slots to limit rotary movement of detent ring 23 separate from member 57.

In FIG. 1 the clutch is shown in the disengaged position and the wheel hub 5 would be free wheeling with respect to the clutch assembly, axle 3 and spindle 4.

When the driver of the vehicle shifts the transfer case into four wheel drive and operates the vehicle torque is transmitted to axle 3 causing it to be a driving axle. Axle 3 consequently begins to rotate and base member 16 and detent ring 23 are forced to rotate with it. As detent ring 13 is keyed to non-rotatable spindle 4 it does not rotate.

Upon rotation of detent ring 23 each of the actuator balls 54 is forced out of the detent it occupies in each detent ring 23 and 13 and forced into contact with each surface 45 and 46. To accomodate the actuator balls between these surfaces detent ring 23 and base member 16 are forced axially outward or outboard along axle 3 and drive teeth 19 on drive gear 18 are forced into driving engagement with teeth 39 on member 29 to cause the wheel hub 5 to be driven by axle 3.

Continued rotation of detent ring 23 relative to ring 13 causes each of the control pins 68 to travel into contact with an end 67 of the control slot 65 which it occupies in member 57. By virtue of this contact the member 57 is forced to rotate with detent ring 23. Due to the radially outward diverging walls 64 of each ball recess 62 each ball is impelled or cammed radially outward until it occupies a ball receiving slot 53 in lip 52 and is in contact with surface 50 of bearing surface 49, substantially as shown in FIG. 2. In this position each ball engages a contact pin 51 affixed to bearing member 49 and forces bearing member 49 to rotate also.

Each of the balls will remain in this position as long as torque is applied to axle 3 and the teeth 19 will remain drivingly engaged to teeth 39 to drive hub 5.

If the vehicle is stopped, placed in reverse and backed up lip 52 will impel or cam each ball radially inward and each ball will, upon continued reverse rotation, be forced back to the radially innermost portion 63 of the ball recess 62 and occupy a detent in each detent ring 13 and detent ring 23 whereby spring 44 will force base member 16 and detent ring axially inward or inboard to disengage teeth 19 from teeth 39. Continued rotation in the reverse direction will immediately force the balls out of the detents to cause the gear teeth to reengage and the sequence of camming the balls outwardly will be repeated as described, above, except in the opposite direction.

To disengage the teeth 19 from the teeth 39 the vehicle is shifted out of four wheel drive at the transfer case and the vehicle is driven in two wheel drive in the direction opposite to that in which it was last driven in four wheel drive and the balls will be cammed radially inwardly to enable the spring 44 to urge teeth 19 out of engagement with teeth 39 to cause the hub 5 to be freewheeling about spindle 4.

Due to no torque being applied to axle 3 by the drive train and the disengagement of teeth 19 from teeth 39 axle 3 no longer is caused to rotate. Therefore, the actuator balls will remain in the detents and the clutch will remain in the disengaged position substantially as shown in FIG. 1 until axle 3 is at some future time caused to rotate by application of torque through the vehicle drive train.

We claim:

1. An actuator ball movement coordinator and cam member for a hub clutch of the ball and cam type, said hub clutch having a first non-rotatable working surface for being affixed to a non-rotatable spindle, a second rotatable working surface rotatable with, and axially moveable on, a selectively driveable axle journaled in said spindle, said rotatable working surface being affixed with a drive means for being selectively engaged with and disengaged from a driven means on a wheel hub mounted for rotation about said spindle, a plurality of actuator balls interposed between said first and said second working surfaces, each of said working surfaces having a plurality of detents, each of said detents in each working surface being sized to receive a portion of an actuator ball for enabling said working surfaces to be relatively close together when each actuator ball occupies a detent in each working surface to enable said drive means to be disengaged from said driven means, said ball movement coordinator and cam member comprising:

an annulus having a central opening for receiving said axle, said annulus being interposed between said first working surface and said second working surface;

a plurality of actuator ball receiving recesses radially outwardly spaced from said opening and equidistant from each other, each of said recesses having a radially innermost actuator ball receiving portion alignable with a detent in each of said working surface to enable an actuator ball contained in said innermost portion to occupy a detent in each of said working surfaces; a pair of diverging walls extending radially outward from the innermost portion of each actuator ball receiving recess; whereby, as said second working surface is forced to rotate with respect to said first working surface, each actuator ball contained in the innermost portion of a recess is forced out of the detents in each working surface to force said second working surface axially away from said first working surface thereby forcing said drive means into engagement with said driven means and a diverging wall of each recess cams an actuator ball radially outwardly out of alignment with the detents to maintain the drive and driven means engaged.

2. The invention defined in claim 1 together with a rotary movement control slot positioned between said recesses.

3. The invention defined in claim 2 in which each of said rotary movement control slots coacts with a protrusion on said rotatable working surface for enabling said ball coordinator and cam member a limited amount of rotary movement relative to said rotatable working surface and assures rotation of said ball coordinator and cam member with said working surface when said limited amount of rotary movement has been achieved.

4. In a torque responsive hub clutch for drivingly engaging a selectively driveable axle journaled in a non-rotatable spindle to a wheel hub mounted for rotation on said spindle, said clutch having a first working surface affixed to said spindle and a second working surface affixed for rotation with said axle and enabled axial movement with respect to said axle, said hub having a driven means, said axle having a driving means affixed for movement with said second working surface for engaging and disengaging said driven means, each of said working surfaces facing each other, each of said working surfaces having a plurality of detents wherein a detent in one of said working surfaces is alignable with a detent in said other of said working surfaces and a plurality of actuator balls interposed between said working surfaces, wherein the improvement comprises:

an actuator ball movement coordinator member interposed between said first and said second working surface for assurring that each of said plurality of actuator balls undergoes substantially the same motion simultaneously, said coordinator member having a substantially annular shape having a central axle receiving aperture and a plurality of ball receiving recesses radially outwardly spaced from said control aperture and positioned equally spaced about said annulus for enabling each ball contained at an innermost radial position in each of said recesses to be alignable with a detent in each said first working surface and said second working surface when said axle is not forced to rotate, each of said ball receiving recesses in said coordinator member having radially outwardly diverging side surfaces for camming said ball contained in said recess radially outwardly when said axle is forced to rotate for forcing said first working surface and said second working surface axially away from each other and maintaining said working surfaces axially away from each other when said axle is subject to rotation whereby said drive means is forced axially into, and maintained in, engagement with said driven means on said wheel hub.

5. The invention defined in claim 4 in which a rotary movement control slot is positioned between said actuator ball receiving recesses.

6. The invention defined in claim 5 in which said second working surface has a plurality of protrusions axially extending toward said ball movement coordinator member for coacting with said rotary movement control slots for causing said ball movement coordinator member to rotate when said second working surface rotates when a protrusion contacts an end of one of said slots.

7. The invention defined in claim 4 together with a cam lip fixedly engaged with a peripheral portion of said second working surface, said cam lip axially extending toward said first working surface and having a plurality of ball receiving openings whereby when said clutch is engaged each of said actuator balls occupies a cam lip ball receiving opening and, upon disengagement of said drive axle and rotation of said wheel hub in a direction opposite to the direction in which it was driven by the axle, said cam lip cams each of said actuator balls radially inwardly.

* * * * *